(12) United States Patent
Dircks et al.

(10) Patent No.: US 7,819,849 B2
(45) Date of Patent: Oct. 26, 2010

(54) LAMINATED MATERIAL AND BODY WEARABLE POUCH FORMED THEREFROM

(75) Inventors: Lon E. Dircks, Salem, WI (US); Michael Gerard Taylor, Mundelein, IL (US); Claudio Giori, Riverwoods, IL (US)

(73) Assignee: Hollister Incorporated, Libertyville, IL (US)

( * ) Notice: Subject to any disclaimer, the term of this patent is extended or adjusted under 35 U.S.C. 154(b) by 186 days.

(21) Appl. No.: 10/861,560

(22) Filed: Jun. 4, 2004

(65) Prior Publication Data
US 2005/0273064 A1    Dec. 8, 2005

(51) Int. Cl.
*A61M 1/00* (2006.01)
(52) U.S. Cl. ...................................... 604/332
(58) Field of Classification Search .......... 604/322, 604/332–344; 428/34.5–35.5; 442/327, 442/361, 364, 381, 389, 394, 398, 399
See application file for complete search history.

(56) References Cited

U.S. PATENT DOCUMENTS

| | | | |
|---|---|---|---|
| 4,490,145 A * | 12/1984 | Campbell | 604/333 |
| 4,681,793 A | 7/1987 | Linman et al. | 428/138 |
| 4,718,898 A | 1/1988 | Puletti et al. | 604/366 |
| 4,826,493 A | 5/1989 | Martini et al. | |
| 4,880,592 A | 11/1989 | Martini et al. | |
| 4,902,553 A | 2/1990 | Hwang et al. | 428/156 |
| 4,906,495 A * | 3/1990 | Martini et al. | 428/36.7 |
| 4,946,720 A | 8/1990 | Oishi et al. | |
| 5,009,648 A | 4/1991 | Aronoff et al. | |
| 5,043,205 A | 8/1991 | Perazzo et al. | |
| 5,110,390 A | 5/1992 | Martini et al. | |
| 5,158,810 A | 10/1992 | Oishi et al. | |
| 5,407,713 A | 4/1995 | Wilfong et al. | |
| 5,417,677 A | 5/1995 | Schneider et al. | |
| 5,423,782 A | 6/1995 | Wolrich | |
| 5,455,091 A | 10/1995 | Oreglia et al. | |
| 5,468,526 A | 11/1995 | Allen et al. | |
| 5,470,624 A | 11/1995 | Oreglia et al. | |
| 5,496,295 A | 3/1996 | Wilfong et al. | |
| 5,567,488 A | 10/1996 | Allen et al. | |
| 5,567,489 A | 10/1996 | Allen et al. | |
| 5,582,820 A | 12/1996 | Wamamoto et al. | |
| 5,643,375 A | 7/1997 | Wilfong et al. | |
| 5,672,163 A | 9/1997 | Ferreira et al. | |

(Continued)

FOREIGN PATENT DOCUMENTS

CH        683 748 A5    5/1994

(Continued)

OTHER PUBLICATIONS

International Search Report and Written Opinion from PCT/US05/19496.

(Continued)

*Primary Examiner*—Melanie J Hand
(74) *Attorney, Agent, or Firm*—Marshall, Gerstein & Borun LLP

(57) ABSTRACT

A laminated material suitable for use in forming body wearable pouches is disclosed. The laminated material comprises three distinct layers including a fabric layer, a film layer and an adhesive layer therebetween. The adhesive layer substantially continuously bonds the fabric layer to the film layer.

17 Claims, 1 Drawing Sheet

U.S. PATENT DOCUMENTS

| | | | |
|---|---|---|---|
| 5,672,643 A | 9/1997 | Burns et al. | 524/90 |
| 5,690,622 A | 11/1997 | Smith et al. | |
| 5,730,919 A | 3/1998 | Wilfong et al. | |
| 5,753,342 A | 5/1998 | McBride et al. | 428/131 |
| 5,759,180 A | 6/1998 | Myhres | |
| 5,776,120 A | 7/1998 | Shelley et al. | |
| 5,800,928 A | 9/1998 | Fischer et al. | |
| 5,869,414 A | 2/1999 | Fischer et al. | |
| 5,879,341 A | 3/1999 | Odorzynski et al. | 604/367 |
| 5,895,694 A | 4/1999 | Zavadsky et al. | |
| 5,938,647 A | 8/1999 | Smith | |
| 5,983,604 A | 11/1999 | Wilfong et al. | |
| 5,989,235 A * | 11/1999 | Quacquarella et al. | 604/332 |
| 6,040,252 A | 3/2000 | Ootuka et al. | |
| 6,050,983 A | 4/2000 | Moore et al. | |
| 6,066,120 A | 5/2000 | Whiteside | |
| 6,096,420 A | 8/2000 | Wilhoit et al. | |
| 6,179,818 B1 * | 1/2001 | Kydonieus et al. | 604/332 |
| 6,271,155 B1 * | 8/2001 | Noma et al. | 442/398 |
| 6,309,500 B1 | 10/2001 | Jensen et al. | |
| 6,329,465 B1 | 12/2001 | Takahashi et al. | |
| 6,451,912 B1 | 9/2002 | Kelch | 525/66 |
| 6,455,161 B1 | 9/2002 | Regnier et al. | |
| 6,479,154 B1 | 11/2002 | Walton et al. | 428/424.4 |
| 6,500,514 B1 | 12/2002 | Blemberg et al. | |
| 6,509,072 B2 | 1/2003 | Bening et al. | |
| 6,558,809 B1 | 5/2003 | Kelch et al. | |
| 6,586,040 B1 | 7/2003 | von Falkenhusen | |
| 6,620,472 B1 | 9/2003 | Shepard et al. | |
| 6,620,474 B1 * | 9/2003 | Regnier et al. | 428/35.7 |
| 6,685,683 B1 | 2/2004 | Clok et al. | |
| 6,685,685 B2 | 2/2004 | Sugita et al. | |
| 6,713,140 B2 | 3/2004 | McCormack et al. | |
| 6,759,357 B1 | 7/2004 | Toriumi | |
| 6,766,817 B2 | 7/2004 | da Silva | |
| 6,918,404 B2 | 7/2005 | da Silva | |
| 7,066,586 B2 | 6/2006 | da Silva | |
| 2002/0064614 A1 | 5/2002 | Turnbull | |
| 2002/0081930 A1 * | 6/2002 | Jackson et al. | 442/416 |
| 2003/0077967 A1 * | 4/2003 | Rock et al. | 442/312 |
| 2003/0114071 A1 * | 6/2003 | Everhart et al. | 442/414 |
| 2003/0120241 A1 | 6/2003 | Sorebo et al. | 604/385.02 |
| 2004/0082897 A1 | 4/2004 | Rangel et al. | |
| 2005/0112338 A1 | 5/2005 | Faulks et al. | 428/204 |

FOREIGN PATENT DOCUMENTS

| | | | |
|---|---|---|---|
| EP | 0 366 802 A1 | | 5/1990 |
| EP | 366802 A1 * | | 5/1990 |
| EP | 1 022 127 A2 | | 7/2000 |
| GB | 2 310 631 | | 9/1997 |
| GB | 2310631 A * | | 9/1997 |
| JP | 10-109371 A | | 4/1998 |
| JP | 2001-017469 A | | 1/2001 |
| JP | 2002-302861 A | | 10/2002 |
| JP | 2003-275240 A | | 9/2003 |
| JP | 2004106554 | | 4/2004 |
| JP | 2004330692 | | 11/2004 |
| JP | 2005-246811 A | | 9/2005 |
| WO | WO 93/11938 | | 6/1993 |
| WO | WO 02/09413 A2 | | 1/2002 |
| WO | WO 2005/051273 A1 | | 6/2005 |

OTHER PUBLICATIONS

Non-Final Office Action for U.S. Appl. No. 11/569,947, dated Aug. 7, 2009.

\* cited by examiner

LAMINATED MATERIAL AND BODY WEARABLE POUCH FORMED THEREFROM

FIELD OF THE INVENTION

The present disclosure is generally directed to a new laminated material and, more particularly, a laminated material suitable for use in forming body wearable pouches.

BACKGROUND OF THE DISCLOSURE

In the field of body wearable pouches, they are formed of material(s) having certain known characteristics. If the pouch comprises a body waste collection pouch, these characteristics include the ability to receive and hold human body waste for a determinable period of time while also serving as a satisfactory gas and odor barrier. Also, it is desirable to form such pouches, especially for ostomy, of a material that has low noise characteristics.

For this purpose, there are commercially available ostomy films which are highly effective in many respects. These ostomy grade barrier films are generally capable of receiving and holding human body waste material and also providing the requisite gas and odor barrier characteristics. However, the available ostomy films are still often less than desirable in terms of certain other important characteristics.

In particular, the known ostomy grade barrier films are sometimes unacceptable as to their "hand" or "feel". They have a tendency to stick against the body in hot or humid conditions and/or after showering, which is generally known to cause discomfort to the user of an ostomy pouch. Further, commercially available ostomy barrier films have a tendency to produce a crinkling noise during movement.

To counteract these problems, it has been proposed to cover the film with a non-woven or other fibrous layer which is thermally secured to the surface of the ostomy grade barrier film. It has been suggested that this will achieve sound-deadening as well as a better "hand" or "feel". However, by thermally securing the non-woven or other fibrous layer to the ostomy grade barrier film, the fibers of the non-woven or other fibrous layer are embedded within the film.

In a perhaps more accurate description, the interstices of the non-woven or other fibrous layer are filled with melted and solidified ostomy film material as a result of the thermal bonding process.

Unfortunately, thermally embedding fibers within the ostomy film has resulted in no significant noise reduction. The normal body movements of the user are found to still cause an undesirable crinkling noise. In addition, the non-woven or other fibrous layer adds comfort to the user but can snag on clothing at times.

In some instances, a non-woven or other fibrous layer is peripherally attached to the ostomy pouch edges. This, too, provides more comfort but does not appreciably reduce noise during user movement. Furthermore, previous attempts to overcome these problems have failed to overcome still other shortcomings.

In particular, it is important for an ostomy pouch to greatly limit the degree to which there is water cling following a shower. The previous attempts to thermally bond a non-woven or other fibrous layer to an ostomy film have failed to satisfy this characteristic. Additionally, an ostomy pouch should ideally be manufactured of materials and with processes that are commercially desirable.

In the past, ostomy grade barrier films, i.e., films that meet the essential characteristics for ostomy, have been expensive which means that the cost of ostomy pouches to the user is high. While there are other films that are commercially available and widely used in many other industries, they have typically been viewed as failing to exhibit essential ostomy characteristics.

In addition to ostomy, it will be understood that similar problems are encountered with many different types of body wearable pouches such as those provided to receive or deliver liquid or semi-solid flowable materials where noise reduction, comfort and/or limited water cling are important criteria.

For the foregoing reasons, it has remained to provide an entirely satisfactory material that can advantageously be manufactured from many different commercially available films while exhibiting the foregoing desirable characteristics.

SUMMARY OF THE DISCLOSURE

Accordingly, the present disclosure is of a laminated material suitable for forming body wearable pouches. The laminated material comprises three distinct material layers wherein the layers are integrally bonded. The three distinct material layers include a fabric layer, an adhesive layer and a thin film layer.

The laminated material utilizes a suitably thick layer of adhesive which permits use of a thin, commercially available film layer. The adhesive layer is between and preferably substantially co-extensive with the facing surfaces of the film layer and the fabric layer. The suitably thick, co-extensive adhesive layer adds bulk to the thin film layer and penetrates the fibers of the fabric layer.

More specifically, the laminated material utilizes a thin, commercially available film layer and a suitably thick adhesive layer in thicknesses that, combined, approximate the thickness of a typical ostomy grade barrier film wherein some of the adhesive penetrates into the fabric layer to achieve excellent bonding of the three distinct material layers. When the laminated material is formed in this manner, the resulting material has all of the essential characteristics of an ostomy grade barrier film while also having low noise characteristics, excellent "hand" or "feel", significantly reduced water cling characteristics, and it permits use of thin, commercially available films previously believed unsuitable for ostomy applications.

The fabric layer can be formed of a knit fabric, a woven fabric or a non-woven fabric. The material for the fabric is preferably composed of fibers or filaments of a synthetic material such as nylon, polypropylene, polyester, low-density polyethylene (LDPE). The fabric can also be formed of a sheath of LDPE having a core wherein the core may be suitably formed of any one or more of polypropylene, polyester and nylon. Alternatively, the material for the fabric can be of a natural material such as cotton, silk or cellulosic materials, or blends of such materials, including blends also containing synthetic fibers or filaments. In addition, the fabric can be treated with water repellant, or can have water wicking fibers therein, if desired.

In some embodiments, the fabric is brushed, sueded, or sheared on at least one surface thereof.

As for the adhesive layer, it is preferably formed of a hot melt thermoplastic adhesive, and is substantially continuous between the fabric layer and the film layer. It produces low noise characteristics, reduces water retention characteristics and adds bulk to the film layer. Additionally, the adhesive forming the layer may be activated or cured by utilization of chemical cross-linking agents, radio frequency, ultrasonic, e-beam, thermal, ultraviolet, or ambient temperature techniques.

With regard to the film layer, it is preferably formed as a multilayer film to have at least an odor barrier sublayer and a sealing sublayer. The odor barrier sublayer is advantageously formed of polyamides, polyvinyl alcohol, ethylene vinyl alcohol, or polyvinylidene chloride materials. Preferably, the film layer is formed with the sealing sublayer of the film layer comprising LDPE or a copolymer of LDPE.

In an alternative construction, the film layer can be formed of a monolithic film, i.e., a film having a single layer that possesses both odor barrier and sealing properties.

Other objects, advantages and features of the present disclosure will become apparent from a consideration of the following specification taken in conjunction with the accompanying drawings.

DETAILED DESCRIPTION OF THE PREFERRED EMBODIMENT

Figure 1:
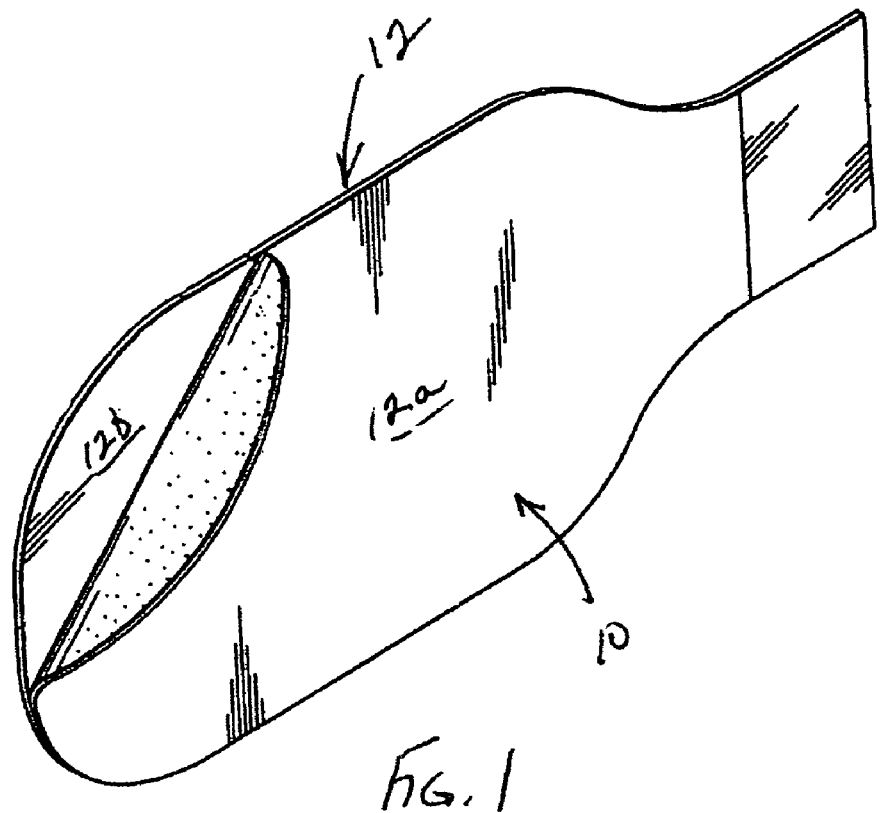
FIG. 1 is a perspective view of a body wearable pouch formed from the laminated material of the present disclosure.
Figure 2:
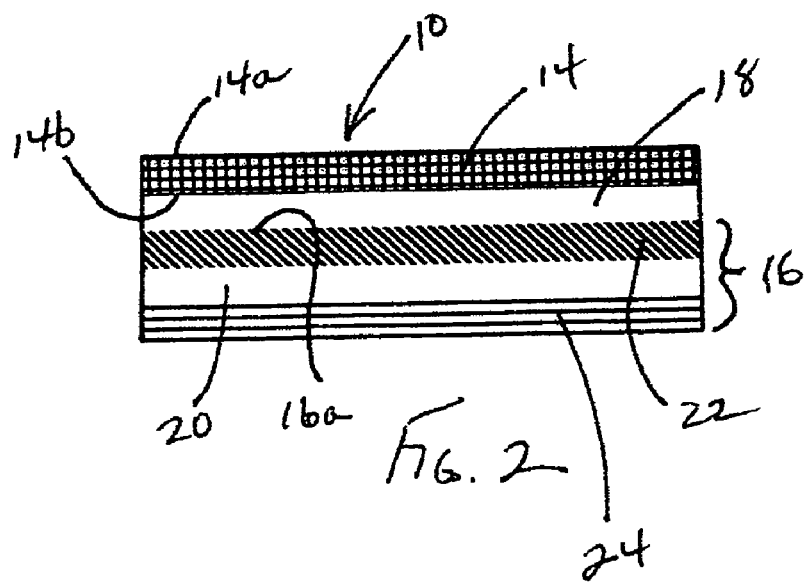
FIG. 2 is a schematic view which illustrates the construction of the laminated material of the present disclosure.

In the illustrations given, and with specific reference to FIGS. 1 and 2, a laminated material 10 suitable for use in forming body wearable pouches including body waste collection pouches such as ostomy pouch 12 is disclosed. The pouch 12 advantageously includes a pair of sidewalls 12a and 12b, and the laminated material 10 of each of the sidewalls 12a and 12b comprises three distinct layers, i.e., a fabric layer 14, a film layer generally designated 16, and an adhesive layer 18 disposed therebetween. With this arrangement, the adhesive layer 18 may comprise an adhesive provided in such a manner as, preferably, to substantially continuously bond the fabric layer 14 to the film layer 16.

Preferably, the fabric layer 14 is formed of any of a knit fabric, a woven fabric or a non-woven fabric. The fabric layer 14 may be treated with a water repellant or have water wicking fibers therein, if desired. In addition, the fabric layer 14 may be brushed, sueded or sheared on at least one surface thereof, e.g., 14a.

As for the adhesive layer 18, it is preferably formed of a hot melt thermoplastic adhesive in such manner as to comprise a substantially continuous layer disposed between the fabric layer 14 and the film layer 16. The adhesive must not impair the flexibility of the film, must maintain the desired noise reduction and must also be soft enough to be comfortable to the wearer of a body wearable pouch formed of the laminated material 10, e.g., hard brittle epoxy is not a suitable adhesive because it is too stiff to achieve these objectives. The adhesive layer 18 may be activated or cured by utilization of chemical cross-linking agents, radio frequency, ultrasonic, e-beam, thermal, ultraviolet, or ambient temperature techniques.

The film layer 16 is a multilayer film having at least an odor barrier sublayer 20 formed of polyamides, polyvinyl alcohol, ethylene vinyl alcohol, or polyvinylidene chloride materials, and at least a sealing sublayer 22. If the odor barrier sublayer 20 is formed of polyvinylidene chloride, it will typically be used with additives such as plasticizers, and the sealing sublayer 22 may be formed of a material such as LDPE or a copolymer of LDPE. If desired, the film layer 16 may comprise a, multilayer film having multiple odor barrier layers such as 20 with at least one sealing layer 22 to form an outer sealing sublayer 16a of the film layer 16.

In an alternative construction, the film layer can be formed of a monolithic film, i.e., a film comprised of a single layer that possesses both odor barrier and sealing properties.

As will be appreciated, the laminated material 10 comprises a material formed of three distinct layers, i.e., a fabric layer 14, a film layer 16, and an adhesive layer 18 therebetween. The laminated material 10 utilizes a suitably thick adhesive layer 18, e.g., approximately 1 mil in thickness, which bonds to the film layer 16 to permit the use of a thin, commercially available film layer while preserving the essential ostomy characteristics. The adhesive layer 18 cooperatively bonds to the thin, commercially available film layer 16, e.g., approximately 2½ mil in thickness, to provide needed assurance against leakage while at the same time providing fully satisfactory gas and odor barrier characteristics. The adhesive layer 18 provides bulk to the thin, commercially available film layer 16 so that the total thickness of the two layers is approximately 3½ mil which is comparable to the typical thickness of 3 to 4 mil for a commercial ostomy grade barrier film. As will be appreciated from FIG. 2, the adhesive layer is between and substantially co-extensive with the outer sealing sublayer 16a of the film layer 16 and the inner facing surface 14b of the fabric layer 14.

The fabric layer 14 is shown schematically in FIG. 2 with the cross-hatching representing fibers of the fabric. The adhesive layer 18 is sufficiently thick that it not only bonds to the outer sealing sublayer 16a of the film layer 16, but also penetrates into the fibers of the fabric layer 14 to achieve excellent bonding of the three distinct material layers 14, 16 and 18. In addition, the laminated material 10 comprises a composite that exhibits a number of extraordinary characteristics.

With the laminated material 10, the resulting composite has all of the essential characteristics of an ostomy grade barrier film. In addition, it exhibits low noise characteristics, excellent "hand" or "feel", and significantly reduced water cling characteristics. Further, it permits the use of a thin, commercially available film of a type previously not known or believed to be suitable for ostomy applications.

Presently, it is believed these results follow from utilizing a suitably thick adhesive layer 18 between a fabric layer 14 and a thin, commercially available film layer 16. The adhesive layer 18 achieves secure surface-to-surface bonding to what is generally viewed as a "noisy", inadequate film product for ostomy and also achieves penetration into the fibers of the fabric layer 14. The secure surface-to-surface bonding of the adhesive layer 18 to the film layer 16, as well as secure penetration bonding of the adhesive to the fabric layer 14, is believed to provide the low noise characteristics. The penetration bonding between the adhesive layer 18 and the fabric layer 14 is also believed to reduce water cling by approximately 50% in relation to fabric which is thermally bonded to film about the perimeter thereof. The laminated material 10 also exhibits excellent "hand" or "feel" since the thickness of the adhesive layer 18 is insufficient to permit adhesive to reach the outer surface 14a of the fabric layer 14.

In testing, it has been found that the laminated material 10 exhibits a decibel level of approximately 50% less than the decibel level of a commercially available ostomy material used in a product sold under the trademark "First Choice" by Hollister Incorporated and that the laminated material 10 exhibits about 50% less water cling than an ostomy control material.

The laminated material 10 was tested for quietness by forming a 4 inch by 4 inch sample into a cylinder and mounting it on a test fixture with one end of the cylinder was held fixed and the other end was rotated about the axis of the cylinder at an angle of 15° at 70 cycles per minute. Noise emissions produced by the film's flexing were analyzed with a sound level meter. For comparison, the same test was conducted on a control material comprising the ostomy material used on the Hollister Incorporated "First Choice" product with a seal on one edge to simulate an ostomy pouch sealed only on the perimeter of the pouch.

In particular, the laminated material which was tested utilized a non-woven fabric layer comprising spun bonded polyethylene of 40 gms/m$^2$, an adhesive layer comprising hot melt thermoplastic adhesive, and a film layer comprising a multilayer film formed of polyethylene skins and a core of nylon. The results were as follows:

| Sample | dBA | dB, 8 kHz | db, 16 kHz |
|---|---|---|---|
| Control Material | 67.8 | 49 | 40.6 |
| Laminated Material Film Layer Only | 68.8 | 55.4 | 53.2 |
| Laminated Material | 49.1 | 17.4 | 18.6 |

In this table, dBA is a weighted average that takes into account the human perception of noise over the entire frequency range. The dB values in the 8 and 16 kHz octave bands are indicative of the noise in the higher frequency range and represent crispness of the noise. The dBA and dB values therefore reveal that the laminated material 10 is considerably quieter than the control material.

With regard to water cling, the laminated material 10 was also tested for water retention relative to a control material comprising a non-woven sealed at the edges to a film. This was done by cutting multiple 4⅜ inch circular samples of the laminated material 10 and the control material, and providing each of the samples with a 4 inch inner diameter sealer using a ⅛ inch seal width. The circular samples cut from the laminated material 10 and the control sample were then individually weighed and clamped in place one at a time under a 4 inch cylinder. A quantity of 100 ml of a 1% soapy water solution was poured into the cylinder after each of the circular samples was clamped in place. The soapy water solution was poured out after a period of 2 minutes for each of the circular samples and the samples were each placed between an equal number of layers of disposable towel. After placement between the layers of disposable towel, each circular sample was run through a nip to blot up any surface water and then reweighed to measure the water retained.

For the multiple circular samples of the laminated material 10, 0.010 grams of soapy water was retained on average whereas for the multiple circular samples of the control material, 0.023 grams of soapy water was retained on average.

This procedure is a modification of the TAPPI test method T441-OM-98, also known as the "Cobb Test".

The laminated material 10 is a material that may be utilized to manufacture a body wearable pouch 12 (see FIG. 1). The laminated material 10 may be formed of various natural or synthetic fabrics and/or fabric treatments and, thus, the fabric layer 14 may comprise the same fabric and/or fabric treatment on both sides of the pouch 12, or a different fabric and/or fabric treatment on the side facing the skin of the user from that on the side facing the user's clothing depending upon the exact nature and purpose of the pouch 12. However, the laminated material 10 is formed of three distinct layers, i.e., a fabric layer 14, a film layer 16 and an adhesive layer 18.

As noted above, the fabric layer 14 is formed of a knit fabric, a woven fabric or a non-woven fabric. The material for the fabric is preferably composed of fibers or filaments of a synthetic material such as nylon, polypropylene, polyester, low-density polyethylene (LDPE). The fabric can also be formed of a sheath of LDPE having a core suitably formed of any one or more of polypropylene, polyester and nylon. Alternatively, the material for the fabric can be of a natural material such as cotton, silk or cellulosic materials, or blends of such materials, including blends also containing synthetic fibers or filaments. In addition, the fabric can be treated with water repellant, or can have water wicking fibers therein, if desired.

In view of the above, the fabric layer 14 may not only be treated with a water repellant or have water wicking fibers, but it may also be brushed, sueded or sheared, and any combination of these characteristics can be utilized on one side, both sides, or neither side thereof, depending upon the desired characteristics for ostomy pouches such as 12

Still additionally, the fabric layer 14 may typically be laminated to the film layer 16 in such a manner that a brushed, sueded, or sheared side comprises the outwardly facing side 14a of the fabric layer. This outwardly facing side 14a may face toward the skin of the user, in which case it may be thought of as a comfort panel, and/or it may face the user's clothing; in either case, treating the fabric so it is brushed, sueded, or sheared is optional. Further, it is also possible for the fabric layer 14 to be laminated to the film layer 16 in such a manner that a brushed, sueded, or sheared side comprises the inwardly facing side 14b of the fabric layer 14.

When a brushed, sueded, or sheared side of the fabric layer 14 comprises the inwardly facing side 14b, it will be the side that is penetration bonded to the adhesive layer 18 which may be beneficial in causing the adhesive layer to penetrate and bind to the fibers of the fabric making up the fabric layer.

As for which of these various options is selected in practice, it will depend upon the physical characteristics that are desired by the end users of body wearable pouches such as 12. The fabric layer 14 may incorporate water wicking fibers on the side of a pouch such as 12 which faces the body of the user to draw perspiration or moisture away from the body. The fabric layer 14 may also be treated with a water repellant on the side opposite the body of the user to provide for quick drying after a user has showered. The water repellant coupled with the effects of the penetration bonding of the adhesive layer 18 with the fibers in the fabric of the fabric layer 14 will enhance resistance to water cling. Further, the placement and use of the brushed, sueded, or sheared side of the fabric layer 14 can be determined based on the desired coefficient of friction and/or "hand" or "feel" of the outwardly facing side 14b.

By providing substantially continuous bonding of the fabric layer 14 to the film layer 16 with a third, distinct adhesive layer 18, which may be formed using an adhesive, the objectionable crinkling sound typical of ostomy barrier films during movement of the user is largely, if not entirely, eliminated.

If desired, the film layer 16 can be formed as a multilayer film having up to about 8 layers which makes it possible to provide for multiple odor barrier layers such as 20. In addition, the film layer 16 can be formed as a multilayer film having a sealing sublayer on one side 22 or both sides 22 and 24 depending upon the desired film characteristics.

As will be appreciated, the laminated material 10 is well suited for not only ostomy pouches and other types of body waste collection pouches but also for any body wearable pouch used to receive or deliver liquid or semi-solid or flowable materials were similar problems are encountered respect to noise reduction, comfort and/or limited water cling While in the foregoing there has been described a preferred embodiment of the disclosure, it will be appreciated that the details herein given may be varied by those skilled in the art without departing from the true spirit and scope of the appended claims.

What is claimed is:

1. A laminated material for use in forming body wearable pouches in combination with at least one other pouch wall to define a body wearable pouch for collecting human body wastes, the laminated material comprising three distinct layers including a heat sealable fabric layer, a heat sealable odor barrier film layer and a separate thermoplastic adhesive layer therebetween, the adhesive layer being a hot melt thermoplastic adhesive that is substantially coextensive with facing surfaces of the fabric layer and the film layer so as to substantially continuously integrally bond the fabric layer to the film layer, said laminated material being neither soluble nor disintegratable in water, and wherein the thermoplastic adhesive layer has a thickness of approximately 1 mil, the film and adhesive layers have a total thickness of approximately 3½ mil, and the adhesive layer penetrates into the fabric layer.

2. The laminated material of claim 1 wherein the fabric layer is formed of natural or synthetic fibers, or blends thereof.

3. The laminated material of claim 2 wherein the fabric layer includes fibers formed of cotton, silk, or cellulosic materials.

4. The laminated material of claim 1 wherein the fabric layer includes fibers comprising nylon, polypropylene, polyester, low-density polyethylene, or a sheath of low-density polyethylene having a core disposed therein.

5. The laminated material of claim 4 wherein the core is formed of any one or more of polypropylene, polyester and nylon.

6. The laminated material of claim 1 wherein the fabric layer is brushed, sueded or sheared on at least one surface thereof.

7. The laminated material of claim 1 wherein the film layer is a monolithic film having both odor barrier and sealing properties.

8. The laminated material of claim 1 wherein the film layer is a multilayer film having at least an odor barrier sublayer and a sealing sublayer.

9. The laminated material of claim 8 wherein the odor barrier sublayer is formed of polyamide, polyvinyl alcohol, ethylene vinyl alcohol, or polyvinylidene chloride.

10. The laminated material of claim 8 wherein the sealing sublayer is formed of low-density polyethylene or a copolymer of low-density polyethylene.

11. A laminated material for use in forming body waste collection pouches in combination with at least one other pouch wall to define a body wearable pouch for collecting human body wastes, the laminated material comprising three distinct layers including a heat sealable fabric layer formed of fibers comprising nylon, polypropylene, polyester, low-density polyethylene, or a sheath of low-density polyethylene having a core disposed therein, a heat sealable odor barrier film layer comprising a multilayer film having at least an odor barrier sublayer and a sealing sublayer, and a separate thermoplastic adhesive layer therebetween, the adhesive layer being a hot melt thermoplastic adhesive that is substantially coextensive with facing surfaces of the fabric layer and the film layer so as to substantially continuously integrally bond the fabric layer to the film layer, said laminated material being neither soluble nor disintegratable in water, and wherein the thermoplastic adhesive layer has a thickness of approximately 1 mil, the film and adhesive layers have a total thickness of approximately 3½ mil, and the adhesive layer penetrates into the fabric layer.

12. The laminated material of claim 11 wherein the core is formed of any one or more of polypropylene, polyester and nylon.

13. The laminated material of claim 11 wherein the fabric layer is brushed, sueded or sheared on at least one surface thereof.

14. The laminated material of claim 11 wherein the odor barrier sublayer is formed of polyamide, polyvinyl alcohol, ethylene vinyl alcohol, or polyvinylidene chloride.

15. The laminated material of claim 11 wherein the sealing sublayer is formed of low-density polyethylene or a copolymer of low-density polyethylene.

16. A laminated material for use in forming ostomy pouches in combination with at least one other pouch wall to define a body wearable pouch for collecting human body wastes, the laminated material comprising:

three distinct layers including a heat sealable fabric layer, a heat sealable odor barrier film layer, and a separate thermoplastic adhesive layer therebetween bonding the fabric layer to the film layer;

the fabric layer being formed of fibers comprising nylon, polypropylene, polyester, low-density polyethylene, or a low-density polyethylene sheath having a core disposed therein;

the film layer being a multilayer film having at least one odor barrier sublayer and at least one sealing sublayer, the odor barrier sublayer being formed of polyamide, polyvinyl alcohol, ethylene vinyl alcohol, or polyvinylidene chloride, and the sealing sublayer being formed of low-density polyethylene or a copolymer of low-density polyethylene; and the thermoplastic adhesive layer being a hot melt thermoplastic adhesive that is substantially coextensive with facing surfaces of the fabric layer and the film layer so as to substantially continuously integrally bond the fabric layer to the film layer, said laminated material being neither soluble nor disintegratable in water, and wherein the thermoplastic adhesive layer has a thickness of approximately 1 mil, the film and adhesive layers have a total thickness of approximately 3½ mil, and the adhesive layer penetrates into the fabric layer.

17. The laminated material of claim 16 wherein the film layer is a multilayer film having multiple odor barrier sublayers and at least one sealing sublayer to form a sealing side of the film layer.

* * * * *